United States Patent [19]
Coccia

[11] 3,774,095
[45] Nov. 20, 1973

[54] SYSTEM FOR BLENDING REGENERATIVE AND DYNAMIC AND FRICTION BRAKING

[75] Inventor: Rudolph A. Coccia, N. Versailles, Pa.

[73] Assignee: Westinghouse Air Brake Company, Wilmerding, Pa.

[22] Filed: Sept. 20, 1972

[21] Appl. No.: 290,480

[52] U.S. Cl. .............................................. 318/371
[51] Int. Cl. ........................... H02p 3/16, H02p 3/26
[58] Field of Search ............ 318/139, 274, 364–366, 318/370, 371, 376

[56] References Cited
UNITED STATES PATENTS

| | | | |
|---|---|---|---|
| 3,621,929 | 11/1971 | Oberthur et al. | 318/371 X |
| 3,488,570 | 1/1970 | Vint, Jr. et al. | 318/371 X |
| 3,546,548 | 12/1970 | Wouk | 318/139 |

Primary Examiner—Bernard A. Gilheany
Assistant Examiner—W. E. Duncanson, Jr.
Attorney—Ralph W. McIntire, Jr. et al.

[57] ABSTRACT

A brake control system for a railway vehicle having an a. c. inverter drive for an induction type motor capable of being operated in a regenerative mode to effect vehicle retardation by either supplying current flow to the system supply source (regenerative braking) for use by other vehicles operating in a power mode or by dissipating the current flow in the form of heat at resistive grids (dynamic braking). The system is normally conditioned so that regenerative braking provides the primary source of vehicle retardation with the torque effort produced being compared with the brake or torque command to effect a friction brake application in accordance with the difference therebetween. The friction brake thus supplements the regenerative brake up to a predetermined point at which it is desired to establish dynamic braking. Once the dynamic brake applies, the combined regenerative and dynamic brake effectiveness results in the torque effort being increased so that the difference between torque effort and torque command is reduced and accordingly the friction brake is released proportionately, thereby providing for combining the friction, dynamic and regenerative brakes, or any combination thereof, in an attempt to provide and maintain a constant rate of deceleration irrespective of variable conditions affecting the degree of regenerative and dynamic braking available.

9 Claims, 3 Drawing Figures

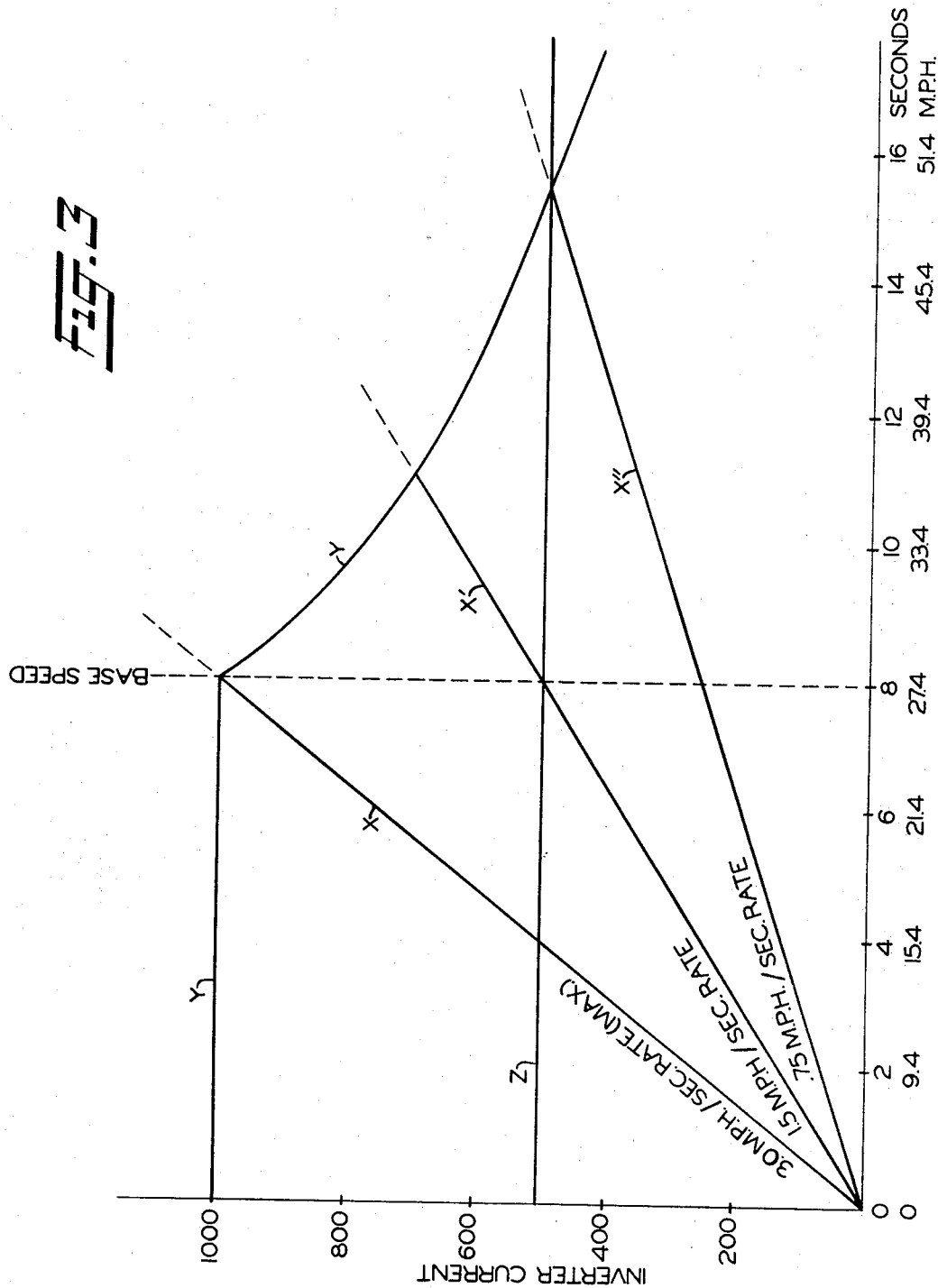

SYSTEM FOR BLENDING REGENERATIVE AND DYNAMIC AND FRICTION BRAKING

BACKGROUND OF THE INVENTION

Present rapid transit railway systems utilize the vehicle traction motors during braking as generators driven from the kinetic energy attained by the vehicle during motoring. This electric braking is the primary method of retardation, being supplemented with friction braking as the ability of the electric brake to effect retardation decreases. The forms of electric braking utilized are distinguished by whether the electric current generated by the traction motors is passed through large electrical resistances, known as dynamic brake grids, and dissipated in the form of heat, hereinafter referred to as dynamic braking, or is returned to the motor supply system for use by other vehicles, hereinafter referred to as regenerative braking.

The disadvantage of dynamic braking is, for the most part, the amount of heat generated when operating in subways, especially where high density service requires that numerous cycles of acceleration and braking occur due to the many station stops. Regenerative braking on the other hand offers considerable savings under these difficult operating conditions, since other accelerating vehicles within the system are able to use the regenerative power produced by vehicles during retardation, and in addition, eliminates the problem of dissipating accumulated heat from the subway. Regenerative braking, however, is not always available, depending upon the receptivity of the power supply system, which varies with the demand of other accelerating vehicles in the vicinity, line gaps, current collector bounce, etc. It is recognized of course that line receptivity is critical in obtaining retardation by regenerative braking, so that it is necessary to provide some supplemental means of braking, such as dynamic or friction braking, in the event of a non-receptive power supply system.

In the more recently developed variable speed, solid-state inverter drives for a. c. type traction motors, it will be noted that the characteristic inverter current limit curve shown in FIG. 3 of the drawings becomes progressively reduced through a predetermined range of motor speed, due to the inverter physical limitations and motor losses. Within this range, it can be seen that the possibility of inadequate retardation may also result in attempting to employ electric braking by either the dynamic or regenerative forms of electric braking, irrespective of the degree of line receptivity. Furthermore, the use of dynamic braking within this reduced power range results in the dynamic brake grids drawing current from the supply system to satisfy the resistive capacity of the dynamic brake. Since this results in no brake effort being produced, a substantial waste of the power supply energy results.

In accordance with the above discussion, therefore, it is axiomatic that discreet use of friction braking is required for blending with the dynamic and regenerative brakes, to obtain the level of retardation desired without excessive friction brake shoe wear, and without excessive loss of d. c. supply energy via the dynamic brake grids.

It is, therefore, an object of the present invention to provide a control system employing regenerative braking as the primary means of vehicle retardation with dynamic and friction braking being combined in a manner which most effectively utilizes each, in accordance with the prevailing conditions, to supplement the regenerative brake.

It is a further object of the invention to initially utilize the friction brake to supplement the regenerative brake in order to assure a substantial level of retardation during vehicle speeds when the level of inverter drive efficiency is insufficient to render the combined dynamic and regenerative brake effective in providing the desired brake rate.

It is another object of the invention to initially utilize the friction brake to supplement the regenerative brake in order to assure a substantial level of retardation during vehicle speeds when the level of inverter drive efficiency is insufficient to render the combined dynamic and regenerative brake effective in providing the desired brake rate.

It is another object of the invention to initially utilize the friction brake to supplement the regenerative brake in order to permit withholding the dynamic brake when low levels of inverter current flow occur incident to low rates of vehicle retardation being in effect, thereby reducing the loss of line power via the dynamic brake grid.

It is still another object of the invention to utilize the dynamic brake to supplement the regenerative brake subsequent to a predetermined level of friction brake being obtained, with a subsequent reduction in the friction brake level resulting in accordance with the degree of retardation available from the combined dynamic/regenerative braking relative to the retardation command.

In accordance with the above objects, there is provided two embodiments of the invention, each of which include an a. c. induction type traction motor driven by a static inverter to which is connected a source of d. c. supply. The torque effort produced by the motor during braking is monitored and compared at a first summing junction with a torque command signal corresponding to the desired rate of vehicle retardation to produce a friction brake command signal representing the amount of friction brake necessary to supplement the regenerative brake when the d. c. supply is non-receptive to regenerative current, or when the inverter efficiency limits the available regenerative current, as indicted by the level of the torque effort feedback signal. A friction brake feedback signal is summed with the friction brake command signal at a second summing junction to regulate the friction brake accordingly.

In the first embodiment of the invention, a threshold detector monitors the friction brake level developed and triggers a flip-flop device to effect closure of a dynamic brake contactor whenever the friction brake pressure developes to a predetermined level. Below this level, the dynamic brake contactor isolates the dynamic brake grid resistor from the inverter and more importantly from the d. c. supply source, while the friction brake serves to supplement the the regenerative brake, as required to satisfy the torque command signal. Following closure of the dynamic brake contactor, increased retardation due to dynamic braking is reflected by an increased torque effort produced by the motor, thereby reducing the friction brake command signal proportionally. Consequently, the degree of dynamic brake effort attained results in a corresponding reduction of the friction brake level, as the dynamic brake attempts to provide the retardation necessary to supplement the regenerative brake.

A similar blending function is accomplished in the second embodiment of the invention, wherein the threshold detector is replaced by a third summing junction to which the torque effort and torque command signals are connected. The algebraic summation of these signals produces an output to trigger the flip-flop device and thereby control the dynamic brake contactor. Also connected to the third summing junction is a bias signal, which delays triggering of the flip-flop until the torque effort produced by the motor decreases a predetermined amount below the torque command. This results in a friction brake command signal being generated at the first summing junction prior to the flip-flop being triggered to initially produce application of friction braking to supplement the regenerative brake. Whenever the bias signal at the third summing junction is overcome by the difference between the torque effort and torque command signals, an output results to trigger the flip-flop controlling the dynamic brake contactor. With the dynamic brake thus cut-in, motor torque effort increases, thereby effecting a corresponding reduction in the amount of friction brake necessary to supplement the regenerative brake.

Other objects, features and attendant advantages of the present invention will become more apparent from the following more detailed description, when considered with the accompanying drawing of which:

FIG. 3 is a graph plotting typical inverter current curves showing the effective current level for given retardation rates throughout the speed range of the motor.

Figure 1:
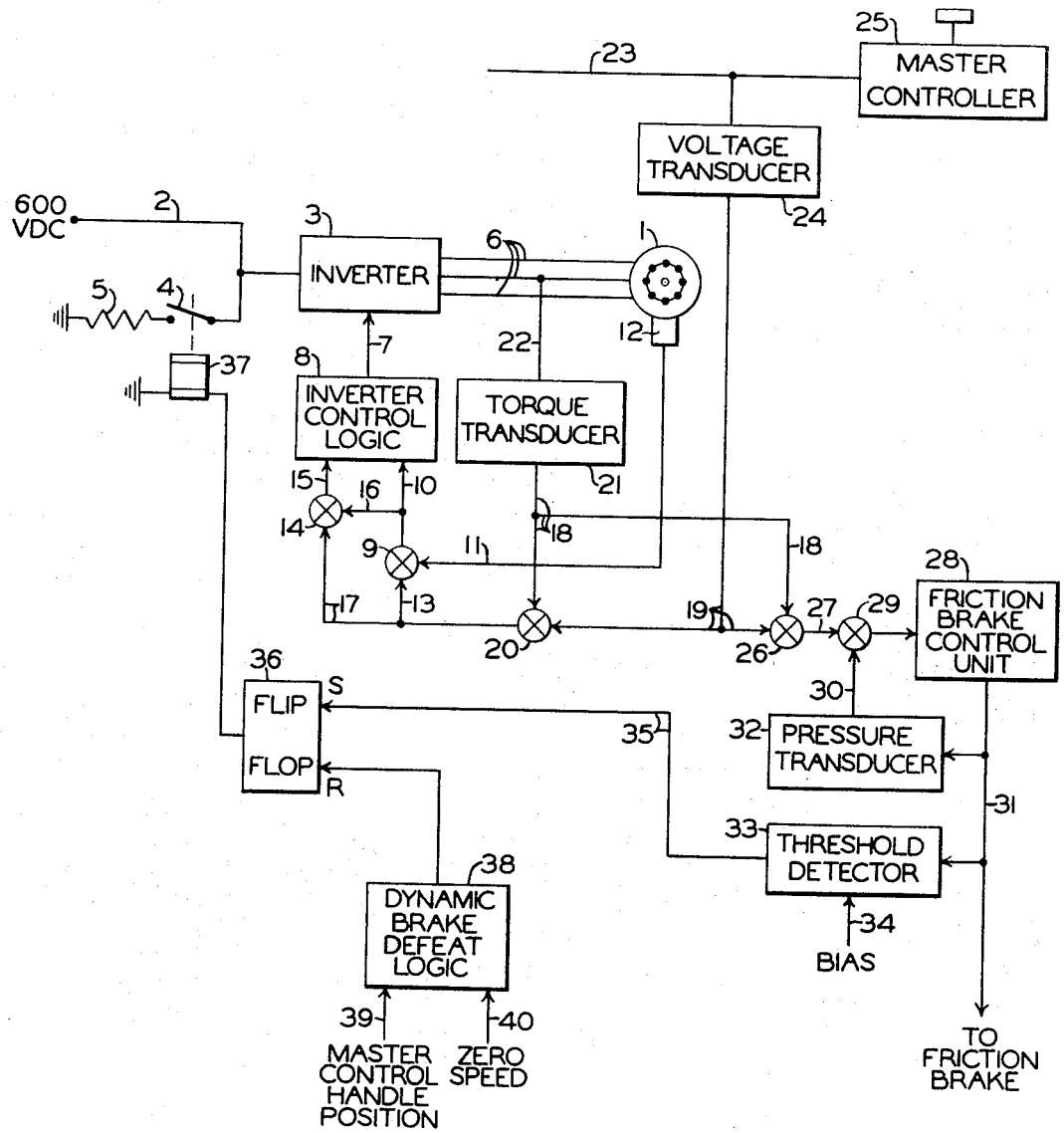
FIG. 1 is a diagrammatic showing one arrangement of the invention.

Referring now to FIG. 1 of the drawings, there is shown a motor control system including one of several conventional a. c. induction type traction motors 1, which may be arranged with the rotor thereof geared or otherwise fixed to rotate with the axles of a railway vehicle, for example. Motor 1 consists of a plurality of poles spaced about its stator having windings which are excited by a polyphase a. c. voltage to produce a rotating magnetic field flux. The rate of rotation of this field flux is proportional to the frequency of the applied polyphase voltage and the direction of rotation is determined by the phase sequence. The motor rotor includes a plurality of conductors, the windings of which have current induced by the rotating stator flux. The difference between the rotating stator flux and rotor speed is the slip frequency of the motor which, together with the rotor reactance, results in a displacement of the rotor flux relative to the stator flux. This displacement is known as the motor torque angle. Interaction between the rotating stator flux and rotor flux due to this torque angle produces torque which causes the rotor to follow the rotating field. When the frequency of the rotating field exceeds the rotor speed, the motor is said to be in a motoring mode of operation in which the electrical energy of a d. c. supply line 2 is connected to an inverter 3 where it is converted into a. c. power for driving motor 1 to propel the vehicle. When the frequency of the rotating field is less than rotor speed, the motor is said to be in a regenerative mode of operation in which the kinetic energy of the vehicle is dissipated in driving the motor to supply reverse current flow back into the line 2, or via a switch 4 to the dynamic brake resistive grids represented by a resistor 5 in parallel with line 2.

Inverter 3 is comprised of a plurality of SCR switching networks, which may be arranged in a manner similar to that shown and described in U.S. Pat. No. 3,207,974, issued Sept. 12, 1965 to W. McMurray. The inverter switching networks, one per phase, receive power from supply line 2 and generate an a. c. output to the motor stator via lines 6 in accordance with gating signals which fire the inverter SCR's.

The gating signals controlling inverter 3 are supplied via conduit 7 between inverter 3 and an inverter logic control unit 8. Conduit 7 represents a plurality of wires carrying digital impulses generated by the inverter logic unit 8 to render the appropriate SCR's of each inverter phase network conductive in proper sequence to convert the d. c. supply from line 2 into the appropriate phase displaced a. c. output waveforms at lines 6. The duration the SCR's are operated determines the voltage supplied to motor 1, while the rate of sequenced firing of the SCR's of the different phase networks creates the rotating stator field flux frequency.

Details of the inverter logic unit 8 are not believed to be necessary for an understanding of the present invention, since any skilled digital logic designer, given the available input variables and desired outputs, could utilize Boolean Algebra or the more recently perfected Mahoney mapping technique to formulate a softwave logic program capable of being reduced to appropriate hardware circuitry. An example of such logic being employed in a similar inverter driven a. c. motor control system, however, may be found in U.S. Pat. No. 3,611,086, issued Oct. 5, 1971 to Boris Mokrytzki and Dennis F. Szymanski, entitled "Integral Carrier Ratio Inverter."

Connected to logic unit 8 from a summing junction 9 is a line 10 representing the frequency at which the inverter 3 is to be driven. A wire 11 connected to summing junction 9 has impressed upon it a signal representing the speed of motor 1, as monitored by a tachometer 12 suitable connected to the rotor output shaft, while a wire 13, also connected to summing junction 9, carries a signal representing the desired motor slip frequency. The frequency control signal at line 10 is thus the algebraic summation of the actual motor speed and the slip command signals, and results in the frequency of the rotating stator flux being controlled relative to the frequency or speed of the motor to adjust the motor slip frequency in accordance with the slip command signal at wire 13.

Also connected to logic unit 8 from a summing point 14 is a wire 15 on which is impressed a signal representing the desired voltage to be supplied to motor 1 via inverter 3. From wires 10 and 13 are connected branch wires 16 and 17, respectively, whose signals are algebraically added at summing junction 14 to vary the voltage control signal at wire 15 as a function of frequency modified by the slip command, which is in effect a rate command.

The slip command signal at wire 13 is derived by the algebraic summation of a torque effort signal at wire 18 and a torque command signal at wire 19 at a summing junction 20. The torque effort signal at wire 18 is representative of the instantaneous torque output of the motor, being generated by a torque transducer 21 having a lead 22 connected to one of the inverter phase output lines 6. Transducer 21 senses the level of current flow between inverter 3 and motor 1 to provide the torque effort signal at wire 18, accordingly. The torque command signal at wire 19 is derived from a voltage transducer 24 subject to the current analog signal effective in a control wire 23, variation of which is under control of master controller device 25. The analog signal in control wire 24 may, for example, vary between 0–0.5 amps in braking and between 0.5–1.0 amps in propulsion. This analog control wire signal is converted by transducer 24 to voltage polarity signals of from 0 to −10 volts in braking, for example, and 0 to +10 volts in propulsion, which represent rates of vehicle retardation and acceleration, respectively.

Also effective at a summing junction 26 is the torque command signal at wire 19 and the torque effort signal at wire 18, which signals are algebraically added to obtain an error signal representing a friction brake command signal at wire 27 indicative of the difference between the torque command and torque effort produced. A friction brake control unit 28 is operated to establish the desired level of friction brake, being connected to the polarity signal effective at the output of a summing junction 29, to which the friction brake command signal at line 27 and a feedback signal at line 30, representing the effective friction brake pressure, are connected and algebraically added. A line 31 connects fluid brake pressure to the vehicle friction brake units in accordance with operation of friction brake control unit 28. A pressure transducer 32 is connected to line 31, converting the pneumatic friction brake pressure into the electrical feedback signal at line 30 representative of the degree of friction brake in effect. A detailed explanation of the friction brake control unit, although not necessary for an understanding of the present invention, may be found in U.S. Pat. No. 3,490,814, issued Jan. 20, 1970 and assigned to the assignee of the present invention.

Also, subject to fluid brake pressure of line 31 is a threshold detector 33 having a bias input 34, which defines a set point at which a digital output signal is produced at line 35 connecting the set input S of a flip-flop device 36 to threshold detector 33. The output of flip-flop 36 is connected to the coil of a relay 37 controlling switch 4. At the reset input R of flip-flop 36 is connected the output of a dynamic brake defeat logic circuit 38 having inputs 39 and 40, which receive a signal whenever master controller 25 is moved to a preselected position, such as "coast" for example, or when the vehicle attains substantially zero speed, respectively. The dynamic brake defeat logic circuitry may, if desired, include additional inputs, any one of which, or combinations of which, will produce reset signal R, such circuitry being conventional and therefore not described.

In considering the operation of the above described system as arranged in FIG. 1, let it be assumed that the handle of master controller 25 is moved to a position calling for a maximum rate of retardation of 3.0 mph/sec., for example. Typically, the signal range effective in control wire 23 varies between 0–1.0 amps, with braking being called for when the control wire signal is within the range of 0–0.5 amps. Accordingly, it is to be understood that an 0.5 amp signal is supplied from control wire 23 to transducer 24, where it is converted to a corresponding maximum negative polarity signal of say −10 volts, when a maximum braking rate is desired. Of course, for lower desired brake rates, proportionally reduced negative polarity voltage signals are produced by transducer 24 in accordance with different selected handle position of master controller 25.

The output of transducer 24 is a torque command signal indicative of the desired motor torque to be developed. This signal is effective at summing junctions 20 and 26 via wire 19 for comparison with a positive polarity torque effort signal provided by torque transducer 21 via wires 18, in accordance with the actual torque developed by motor 1. During braking, for example, the torque effort feedback signal at summing junction 20 is of a positive value which, when compared with the torque command signal, produces the desired motor slip signal at the output of summing junction 20. The motor slip signal effective at wire 13 during braking, therefore, is of negative polarity and is compared at summing junction 9 with the rotor speed signal at wire 11, which may be assumed to be positive polarity. The algebraic summation of these signals at the output of summing junction 9 is effective at the inverter logic control unit 8 as an indication of the frequency at which inverter 3 must operate to produce the desired rotating stator field flux frequency. In braking, the negative slip signal at summing junction 9 adjusts the frequency control signal at wire 10 to set up logic unit 8 so that the thyristor firing signals controlling the operating frequency of inverter 3 produce the rotating stator field flux of motor 1, so as to be in lagging relationship relative to the rotor of motor 1, thereby establishing the regenerative mode of motor operation in which reverse current flow occurs between motor 1 and inverter 3.

Concurrently, the slip control signal effective at wire 17 is compared at summing junction 14 with the frequency control signal effective at wire 16 to provide a voltage control signal at logic unit 8 via wire 15. This further conditions logic unit 8 so that the thyristor firing signals 7 effect a chopping action of inverter 3 for the purpose of controlling the voltage supplied to the motor when operating within a particular speed range in which it is desired to vary voltage linearly with frequency.

It will be understood, therefore, that when the handle of master controller 25 is moved to a brake position corresponding, for example, to the assumed 3.0 mph/sec. rate of retardation, inverter 3 is driven at a frequency which reduces the frequency of the motor field flux sufficient to lag the rotor, thereby forcing motor 1 into a regenerative mode of operation in which the dynamic energy of the vehicle is dissipated in driving motor 1 to supply current to line 2 or to the resistive grids 5 at a power level which may or may not be capable of satisfying the 3.0 mph/sec. braking rate called for.

With the vehicle operating at a speed below base speed where the inverter operating efficiency provides current flow sufficient to obtain the 3.0 mph/sec. brake rate called for, as indicated by curve x of FIG. 3, the current generated by motor 1 is supplied via the 3 phase motor leads 6 and inverter 3 to the supply line 2 for use by other vehicles within the system. The resultant positive torque effort generated is sensed by torque transducer 21 and fed to summing junction 26 to withhold error signal 27 and thereby prevent application of friction brakes, as long as motor 1 is producing full regenerative braking consistent with the 3.0 mph/sec. rate of vehicle retardation called for.

In the event, however, supply line 2 is totally or even partially non-receptive to regenerative current, it is to be understood that current flow and consequently motor torque are reduced accordingly, irrespective of the level of operating efficiency of inverter 3. As previously mentioned, many conditions affect the receptivity of power line 2, such as line gaps, current collector bounce, the demand of other vehicles in the vicinity, etc. Accordingly, the reduced current flow from motor 1 results in a reduced torque effort, as sensed by torque transducer 21, resulting in the positive polarity feedback signal at summing junction 26 being at a value less than the negative polarity brake command signal, so that a negative error signal results at wire 27 representing the degree of friction brake necessary to satisfy the brake command. This friction brake command signal at wire 27 thus reflects the inadequate torque effort monitored by torque transducer 21 in accordance with the level of reverse current flow at the motor phase leads 6 whenever the level of receptivity of line 2 prevents the desired motor torque effort from being realized. At summing junction 29, the friction brake command signal produces an analog output of positive or negative polarity depending upon whether the brake pressure feedback signal 30 indicates that the effective brake pressure in line 30 is greater or less than the friction brake command signal. Assuming there is no friction brake available at the time, the absence of a positive polarity friction brake feedback signal at wire 30 results in a negative output at summing junction 29 to which friction brake control unit 28 responds to effect a friction brake application. As the friction brake pressure develops, the feedback signal at wire 30 generated by pressure transducer 32 gradually reduces the negative polarity output of summing junction 29 until at substantially zero volts, friction brake control unit 28 becomes effective to lap off further brake pressure development. The resultant combination of regenerative and friction brake effort realized thus satisfies the brake command signal to maintain the assumed 3.0 mph/sec. rate of retardation relatively constant throughout the stop distance irrespective of variations in the line receptivity.

In order to limit the use of the friction brake and consequently reduce wear of the friction brake shoes, which can be costly, threshold detector 33 produces an output signal whenever the friction brake pressure development increases to a level which exceeds a value set by the bias input 34 of threshold detector 33. Accordingly, flip-flop 36 is set to its "on" state in which dynamic brake relay 37 is energized, effecting closure of contact 4 so as to connect the load resistance of the dynamic brake grids 5 to inverter 3 in parallel with line 2. This results in a load source being provided to establish current flow between inverter 3 and the regenerating motor 1, thereby establishing dynamic braking to effect vehicle retardation or torque effort, as monitored by torque transducer 21. Consequently, torque transducer 21 increases the torque effort signal effective at summing junction 26, resulting in the error signal 27 being modulated accordingly.

Since the positive polarity friction brake feedback signal at wire 30 is at a level corresponding to the brake pressure initially developed in supplementing the regenerative brake, the output of summing junction 29 becomes positive due to the negative error signal 27 being modulated. This results in the friction brake control unit 28 becoming effective to release the friction brake pressure to the level indicated by the error signal, which in most instances will correspond to a complete release of the friction brake. Threshold detector 33 removes its output signal to flip-flop 3 whenever the friction brake level is reduced below a value corresponding to the bias signal at input wire 34. However, the flip-flop remains in its "on" state to maintain the dynamic brake grid 5 in circuit with inverter 3 until flip-flop 36 is reset, the purpose being to prevent on-off cycling of the dynamic brake and consequently limiting wear of the contactor components comprising switch 4, due to high voltage arcing thereat.

Once the vehicle is brought to a stop, wire 40 is energized at the dynamic brake defeat logic 38, for example, by closure of a zero speed responsive contact (not shown) to generate a reset signal at flip-flop input R, thus resetting the flip-flop to its "off" state in which relay 37 is deenergized and switch 4 is returned to its normally open position. This effectively cuts out the dynamic brake grid 5 to reestablish line 2 as the primary load via which current is passed preparatory to a subsequent cycle of regenerative braking. In a similar manner, dynamic braking may be terminated at the discretion of the operator by movement of the master controller handle to a preselected position in which wire 39 is energized by a contact closure and flip-flop 36 is reset through the dynamic brake logic 38.

If it is now assumed that the vehicle speed is in the speed range above base speed, for example, when the assumed 3.0 mph/sec. brake command rate is called for at master controller 25, it will be apparent from the inverter current curve Y in FIG. 3 that insufficient current is capable of being supplied by the inverter 3 to line 2 to obtain the desired regenerative braking even though line 2 may be fully receptive to regenerative current supply. Of course, progressively reduced braking rates, such as indicated by curves X' and X'', also reach a point where insufficient current flow is obtained via inverter 3 to obtain the desired braking rate, but a progressively higher speeds above base speed. Whereas in previous assumed conditions of braking below base speed, sufficient current flow was available to obtain the desired brake rate by the dynamic brake when line receptivity became inadequate, the desirability of the system operating to initially employ the friction brake to supplement the regenerative brake will now be apparent, since the reduced inverter current flow in the higher speed ranges renders the dynamic as well as the regenerative brake incapable of producing the rate of retardation called for irrespective of the receptivity of line 2. Of course, once the desired limit of friction braking is reached, the dynamic brake will be cut in, as previously explained, for the purpose of providing dynamic braking in the event the condition of line 2 becomes non-receptive to render the available level of regenerative braking ineffective. The maximum level of current capable of being drawn by the dynamic brake grid 5 may be selected, as shown by line z of FIG. 3, at a level which substantially reduces the loss of power from line 2 when the dynamic brake grid is cut in and the level of inverter current flow is insufficient to satisfy the load demand. It is to be understood of course that when this occurs, the dynamic brake grid resistance draws current via switch 4 and line 2. Therefore, a compromise is reached in selecting the dynamic brake grid resistance between the level of dynamic brake desired and the level of line power loss which is acceptable.

In again viewing FIG. 3 and particularly curve X" with respect to the dynamic brake current curve Z, it will be seen that curve X" and additional current curves (not shown) corresponding to brake rates below 0.75 mph/sec. fail to reach the current level demanded by curve Z throughout the entire speed range. It will be appreciated, therefore, that in setting the friction brake limitation at a value which permits the friction brake to produce the 0.75 mph/sec. rate without cutting in the dynamic brake, another advantage in having the friction brake apply initially is realized in that there will be no loss of line power to the dynamic brake grids at the lower braking rates, as would otherwise occur if it were necessary to cut in the dynamic brake grid 5.

Figure 2:
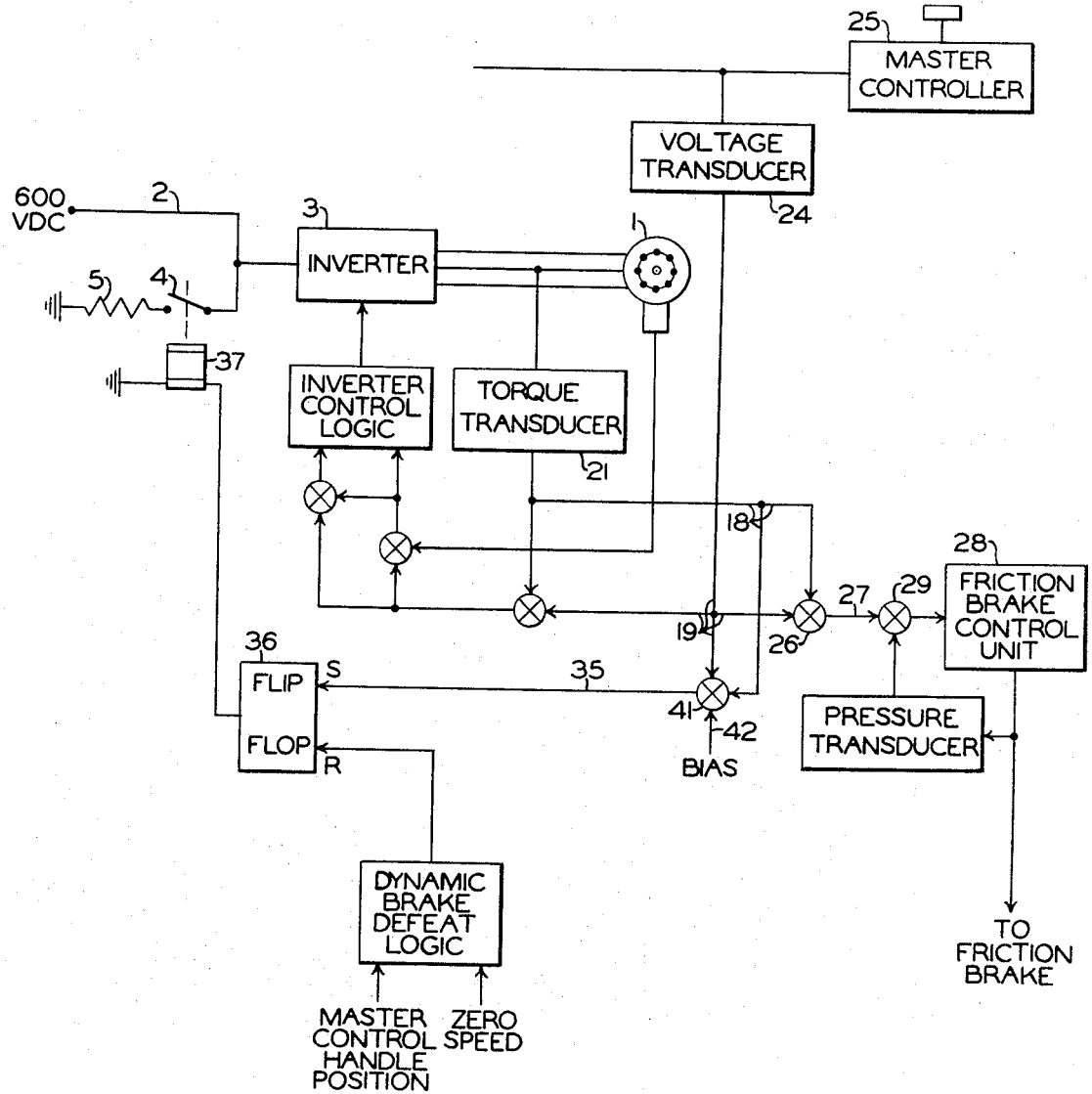
FIG. 2 is a diagrammatic showing an alternate arrangement of the invention.

In FIG. 2 of the drawings, is shown an alternate embodiment of the invention which is similar to that of FIG. 1 except that the function of threshold detector 33 is replaced by an additional summing junction 41, the output of which is connected via wire 35 to the set input S of flip-flop 36. Connected to summing junction 41 is the negative polarity torque or brake command signal via wire 19, the positive polarity torque effort signal via wire 18 and a positive polarity bias signal via wire 42. Since FIG. 2 is identical to FIG. 1 in all other respects, corresponding devices will carry like reference numerals and no further description will be undertaken relative to FIG. 2.

Again, assuming that a maximum brake rate is desired, the master controller handle is moved to a position which produces a maximum torque command signal. As long as the torque effort signal accordingly produced is not less than the torque command by a greater value than the bias signal, there will be no output produced at summing junction 41, and flip-flop 36 will remain in its normal reset condition in which relay 37 is deenergized. The dynamic brake grid 5 is accordingly cut off from inverter 3 by normally open switch 4 to withhold initiation of the dynamic brake.

Concurrently, any error signal at summing junction 26 indicative of a difference existing between the torque command and torque effort signals, due for example to line 2 being in a non-receptive condition or due to low inverter current flow or a combination of each, results in the necessary amount of supplemental friction brake being provided by control unit 28, as previously explained, to maintain the brake rate called for.

Should the difference between the torque command and torque effort signals at summing junction 41 (which difference corresponds to the error signal at the output of summing junction 26 controlling the friction brakes) exceed the bias signal thereat (which corresponds to the desired limit of friction brake), a signal will be impressed upon wire 35 sufficient to set flip-flop 36 to its "on" state. As previously explained, this results in the dynamic brake grid 5 being placed in circuit with inverter 3 to initiate dynamic braking. Should the torque effort as sensed by transducer 21 subsequently increase, the friction brake will be proportionately reduced so that functionally, the system of FIG. 2 is identical to FIG. 1, being simpler in structure more easily assembled on a railway vehicle, and ultimately less costly.

Having now described the invention, what I claim as new and desire to secure by Letters Patent is:

1. A brake control system for a railway vehicle driven by a traction motor, comprising in combination:
   a. circuit means for connecting said traction motor with a source of supply voltage and an ohmic load in parallel, and including a normally open switch intermediate said ohmic load and said motor whereby said motor is effective to supply power to said voltage source when operating in a regenerative mode,
   b. means for controlling the degree of regeneration of said motor in accordance with a brake command signal,
   c. means for sensing the torque produced by said motor to provide a brake effect signal corresponding to the level of power flow generated by said motor,
   d. friction brake control means for providing friction braking in accordance with the difference between said brake command signal and said brake effort signal to supplement the regenerative action of said motor in obtaining the desired level of retardation of said vehicle when said source of supply voltage is non-receptive to regenerative power, and
   e. means for effecting operation of said switch means to connect said ohmic load with said motor at a predetermined level of said friction brake to provide for a level of regenerative power flow from said motor corresponding to said brake command signal.

2. The system, as recited in claim 1, further comprising lockup means for maintaining said ohmic load connected with said motor irrespective of a subsequent reduction of said friction brake application below said predetermined level in accordance with said increased level of regenerative power flow increasing said brake effort signal.

3. The system, as recited in claim 2, further comprising means for resetting said lockup means in accordance with selective inputs being provided thereto.

4. The system, as recited in claim 3, wherein said lockup means comprises:
   a. a relay to which said normally open switch is operatively responsive, and
   b. a flip-flop having one input connected with said switch controlling means, another input connected with said reset means and an output connected with said relay to effect closure of said switch only when a signal is provided at said one input and absent at said another input.

5. The system, as recited in claim 1, further comprising:
   a. first summing means subject to said brake command signal and said brake effort signal for providing an error signal in accordance with the difference therebetween,
   b. transducer means for providing a feedback signal representative of the level of said friction braking in effect, and
   c. second summing means subject to said error signal and said feedback signal to provide a friction brake control signal for regulating said friction brake control means.

6. The system, as recited in claim 1, in which:
   a. said motor is an a. c. induction motor, b. said source of supply voltage is regulated d. c. power to which other vehicles are dependent for supply voltage, c. said means for controlling the degree of regeneration of said motor includes:

i. first summing means for providing a motor slip control signal in accordance with the difference between said brake command and said brake effort signals effective thereat, ii. speed sensing means for providing a speed signal representative of the speed of rotation of said motor, and iii. second summing means subject to said slip control signal and said speed signal for providing a frequency control signal, and d. said circuit means includes inverter means subject to said frequency control signal for energizing the stator of said motor at a frequency which lags the rotating frequency of the rotor of said motor an amount corresponding to said brake command signal.

7. The system, as recited in claim 6, further comprising:

a. a control wire extending through said vehicle, b. a controller device for effecting variation of current flow in said control wire in accordance with the desired rate of retardation of said vehicle, and c. transducer means connected to said control wire for monitoring the level of current therein to provide said brake command signal as a voltage proportional to current effective in said control wire.

8. The system, as recited in claim 1, wherein said means operable at a predetermined level of said friction brake comprises a threshold detector subject to fluid pressure supplied to brake units in accordance with operation of said brake control means, said threshold detector having a bias signal provided to prevent said detector for providing an output to effect operation of said switch means until said friction brake fluid pressure exceeds said bias signal.

9. The system, as recited in claim 1, wherein said means operable at a predetermined level of said friction brake comprises summing means subject to said brake command signal, said brake effort signal and a bias signal of the same polarity as said brake effort signal and corresponding in value to said predetermined friction brake level to prevent said summing means for providing an output to operate said switch means until the difference between said brake command and said brake effort signals corresponding to said error signal exceeds a value corresponding to said predetermined friction brake level.

* * * * *